United States Patent
Zaman et al.

(10) Patent No.: US 11,425,152 B2
(45) Date of Patent: Aug. 23, 2022

(54) PHYSICAL AND NETWORK SECURITY SYSTEM AND MEHTODS

(71) Applicants: Asna Suhail Zaman, Sterling, VA (US); Muhammad Usman Afzal Chaudhry, Sterling, VA (US)

(72) Inventors: Asna Suhail Zaman, Sterling, VA (US); Muhammad Usman Afzal Chaudhry, Sterling, VA (US)

( * ) Notice: Subject to any disclaimer, the term of this patent is extended or adjusted under 35 U.S.C. 154(b) by 0 days.

(21) Appl. No.: 17/577,003

(22) Filed: Jan. 16, 2022

(65) Prior Publication Data
US 2022/0141239 A1    May 5, 2022

Related U.S. Application Data

(60) Provisional application No. 63/218,913, filed on Jul. 7, 2021, provisional application No. 63/187,131, filed on May 11, 2021.

(51) Int. Cl.
*H04L 9/40* (2022.01)
*G06F 21/71* (2013.01)

(52) U.S. Cl.
CPC .......... *H04L 63/1416* (2013.01); *G06F 21/71* (2013.01)

(58) Field of Classification Search
USPC .......................................................... 726/23
See application file for complete search history.

(56) References Cited

U.S. PATENT DOCUMENTS

| | | | |
|---|---|---|---|
| 7,480,715 B1 * | 1/2009 | Barker | H04L 43/00 709/224 |
| 10,019,677 B2 * | 7/2018 | Gill | G06Q 10/067 |
| 10,200,194 B2 * | 2/2019 | Field | G06F 9/4401 |
| 10,348,767 B1 * | 7/2019 | Lee | H04L 63/0236 |
| 11,105,526 B1 * | 8/2021 | Andersen | F24F 11/89 |
| 2008/0209505 A1 * | 8/2008 | Ghai | G06Q 10/06 726/1 |
| 2018/0091528 A1 * | 3/2018 | Shahbaz | H04L 63/1475 |
| 2019/0295207 A1 * | 9/2019 | Day | G08B 5/38 |
| 2020/0329056 A1 * | 10/2020 | Treit | H04L 61/4555 |
| 2020/0358804 A1 * | 11/2020 | Crabtree | H04L 63/102 |
| 2021/0042422 A1 * | 2/2021 | Ambekar | H04L 63/1441 |
| 2021/0174952 A1 * | 6/2021 | Leong | H04L 67/12 |
| 2021/0211868 A1 * | 7/2021 | Rodriguez Bravo | H04W 12/35 |
| 2021/0329023 A1 * | 10/2021 | Mohammad | H04L 63/1416 |
| 2021/0348731 A1 * | 11/2021 | McGovern | H05B 47/155 |
| 2021/0377284 A1 * | 12/2021 | Soryal | H04L 63/0869 |

FOREIGN PATENT DOCUMENTS

WO    WO-2016040506 A1 *    3/2016    ............. G06F 21/31

* cited by examiner

*Primary Examiner* — Sakinah White Taylor
(74) *Attorney, Agent, or Firm* — Barry Choobin; Patent 360

(57) ABSTRACT

An interface system for securing devices on a network gaining access to an external wide area network, such as Internet. The interface system includes a gateway, a vulnerability scanner, switch, cameras, network access controller, and machine learning module. The interface system detects any unusual activity from a device on the network and can take autonomous decisions based on calculated scores to allow or block the unusual activity.

18 Claims, 6 Drawing Sheets

SECURITY SCORE CALCULATION

Old data: alerts, Notifications, logs, incidents, errors etc, received from the components including routers, firewalls, switches, wireless controllers, access points, NACS, scanners, SIEM, cameras, sensors, and IP access control
+
Current or live data including alerts, notifications, logs, incidents, errors etc., Received from the components
+
Specific information requested from the components
+
Behavioral analysis
+
Profiling network traffic, device, or user
+
Artificial intelligence
+
Machine learning
+
Security analysis
+
Data correlation
+
Past feedbacks from the admins from an app.

Fig. 5

PHYSICAL AND NETWORK SECURITY SYSTEM AND MEHTODS

CROSS-REFERENCE TO RELATED APPLICATIONS

This application claims priority from the U.S. provisional patent application Ser. No. 63/187,131, filed on May 11, 2021; and this application also claims priority from the U.S. provisional patent application Ser. No. 63/218,913, filed on Jul. 7, 2021, both the above applications are incorporated herein by reference in its entirety.

FIELD OF INVENTION

The present invention relates to an interface system and a method for physical and network security, and more particularly, the present invention relates to a complete network security gateway.

BACKGROUND

Work from home is becoming a popular concept and most industries are allowing their employees to work either full time or partly from home. Particularly in the last decade, an increasing number of companies are favoring the work from home concept. Covid-19 pandemic which caused nationwide lockdowns in several countries also forced companies to allow their employees to work from home. Work from home does not limit itself to working from a fixed residential place, but the employees can access secure network resources of their employer while at public places, such as cafes, restaurants, and hotels while traveling. Also, the employees may use their personal devices, such as laptops, smartphones, and like.

However, the use of public networks and unsecured devices has posed a serious network threat. Hackers have been constantly developing sophisticated ways to breach security protocols and harm network devices or steal privileged information. Although several internet security applications are available that can be installed in computers, smartphones, and the like, however, such applications are of limited use. For example, the application software may generate an alarm for a network attack, however, the users may not be skilled to handle the situation. Moreover, the user may not be available to attend to the situation.

Routers are interface processing devices for securely connecting devices on an internal network to connect to external packet-switched networks, such as the internet. The router can connect an internal or local area network to an external or wide area network. The routers can act as a guard to secure the connection and block external network attacks. The router includes a firewall that blocks the external network attacks, however, the security system in the routers has limited protection against sophisticated network attacks, such as DDoS type attacks. Moreover, the routers cannot safeguard against threats from inside the internal network. Known security systems also cannot block the physical access.

Thus, a need is appreciated for an interface security system that can protect devices on a network from both external and internal threats. Moreover, a need is appreciated for an interface security system that can autonomously handle security situations.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an interface system and method for providing security to devices on a network.

It is another object of the present invention that the interface system includes a gateway providing comprehensive security to network devices connecting to the internet.

It is still another object of the present invention that the interface system can autonomously handle network threats without intervention from the user.

It is yet another object of the present invention that the interface system can reduce the burden on a team responsible for the upkeep of the network.

It is a further object of the present invention that the interface system can provide details of threats or attacks to the network administrators.

It is still a further object of the present invention that multiple interface systems can be centrally managed.

It is yet a further object of the present invention that the system can manage multiple types of devices on a network gaining access to the internet.

It is an additional object of the present invention that the system can timely provide notification of any physical damage to building or hardware.

It is still an additional object of the present invention that the system can take autonomous decisions in case of any physical threat to the hardware.

In one aspect, disclosed is an interface system and method for managing the security of devices on a network. The disclosed system can provide a complete internet security gateway that can manage traffic between an internal network and an external network. The different devices, such as computers, laptops, smart televisions, IoT devices, and like on the network can be protected against both internal and external security breaches and threats.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 5 shows a method for score calculation, according to an exemplary embodiment of the present invention.

DETAILED DESCRIPTION

Figure 1:
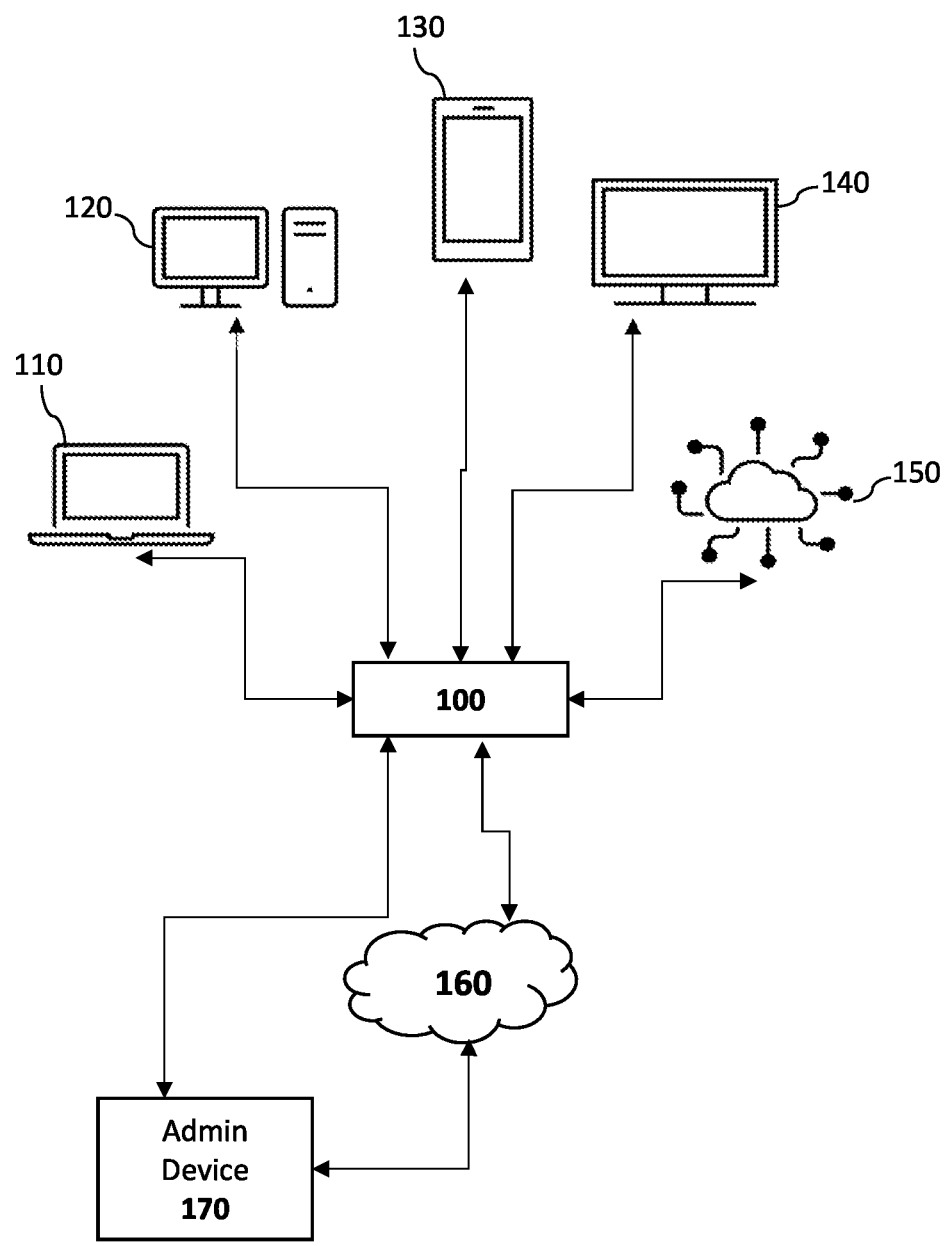
FIG. 1 is an environment diagram showing the disclosed interface system connected to an external network and different devices, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Physical security related Data: The physical security data can include the data collected from different sensors, cameras, and IP access Control device, the sensor and the cameras can be for identifying a person in predefined floor area, determining movements of persons in a floor area or between different predefined floor areas; detecting smoke or fire, water leakage detection, window or door broken sensor, force accessed to a building, abnormal access pattern of a person to a building and like other security measures known to a skilled person for securing a computer hardware and a building.

Network security related Data: The network security data can include logs, metrics and other data from the network and network connected devices. For example, a computer accessing malware websites or a computer spreading malwares to internal devices and so on.

Physical Unusual Activity: Refers to unusual physical activity in a building or a room. For example, an employee entering a building after working hours or when the building is closed.

Network Unusual Activity: The network unusual activity may refer to Normally printer only communicate internally and never communicated on the internet. Suddenly a printer communicating with someone on internet and downloading and uploading large amount of data.

Blocking Physical Access: Blocking the physical access can refer to locking an exit or entry to an enclosed space, such as but not limited to the storerooms, server rooms, and rooms with restricted access, and the like.

Blocking, restricting, or limiting Network Access refers to controlling and limiting a network access of an electronic device on the network. For example, an infected computer on the network can be blocked to access the internet but can access the local area network, the internet can be accessible but local area network can be blocked. An example of limiting the access can include permitting internet access but limiting uploading or downloading of a file from the hard disk of the computer.

Disclosed are an interface system and method of protecting devices on a network against external and internal network attacks and security breaches. The disclosed system can include a gateway that can provide complete internet security to different devices that connect to the internet. The disclosed system may allow remote management of the security monitoring and timely interventions from a skilled team to handle any security situation.

Referring to FIG. 1, which is an environmental diagram showing an exemplary embodiment of the disclosed interface system 100 in communication with a number of devices. FIG. 1 shows the interface system 100 acting as a router and connecting the number of devices to an external network 160 that can be the internet. FIG. 1 shows a laptop 110, a desktop 120, a smartphone 130, a smart TV 140, and an IoT device 150 connected to the disclosed interface system 100. It is to be understood that any computing device for gaining access to a network can be connected to the disclosed interface system 100. FIG. 1 shows few example devices for illustration purposes only, however, any device can connect to a router for gaining access to a network, all such devices are within the scope of the present invention. FIG. 1 also shows an admin device 170 that can be directly connected to the interface system 100 through a wired or wireless connection. Alternatively, the admin device 170 can also be connected to the interface system 100 through the external network 160. It is to be noted that the external admin device can be optional. The admin device 170 can belong to an IP admin, network administrator, and like person or team responsible for maintaining and safeguarding the network and network resources.

Figure 2:
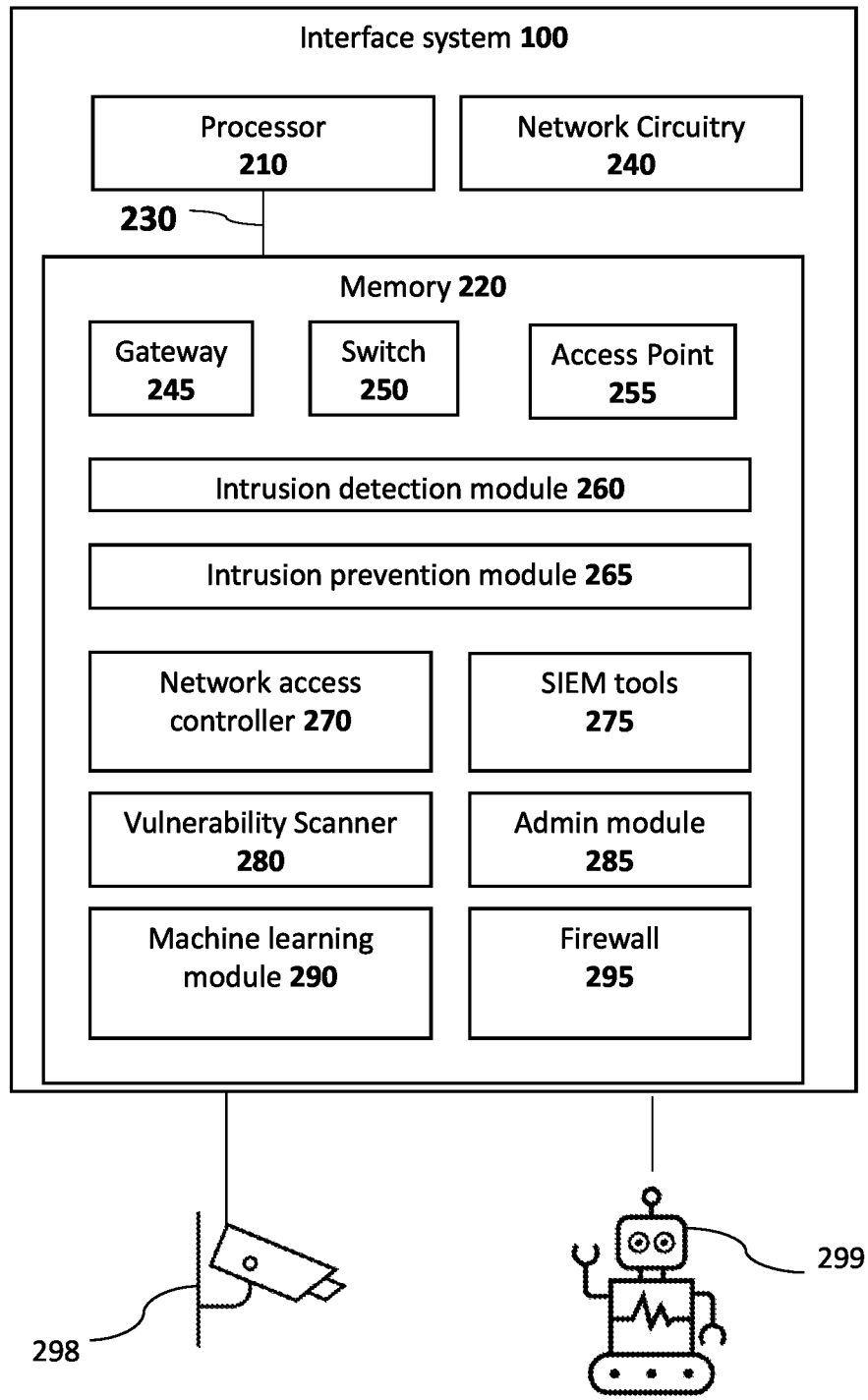
FIG. 2 is a block diagram showing the architecture of the interface system, according to an exemplary embodiment of the present invention.

Referring to FIG. 2, which is a block diagram showing an exemplary embodiment of the architecture of the disclosed interface system 100. The disclosed interface system 100 can include a processor 210, a memory 220, a network circuitry 240, wherein the memory 220, and the network circuitry 240 can be connected to the processor 210 through a system bus 230. The processor 210 can be any logic circuitry that responds to and processes instructions fetched from the memory 220. As shown in FIG. 2, the memory can include application software, a set of instructions, and modules according to the present invention for execution by the processor 210 to perform one or more steps for securing devices on a network against internal and external threats and security breaches. The network circuitry 240 can provide a physical interface for wired or wireless connecting the different computing devices, as shown in FIG. 1. In one case, the network circuitry can include ports, such as LAN port, optical cable port, WAN port, and like. Such ports are known to a skilled person for use in routers, and any such port or network circuitry architecture is within the scope of the present invention.

The memory 220 can include a gateway 245, a switch 250, access points 255, intrusion detection module 260, intrusion prevention module 265, network access controllers 270, SIEM tools 275, vulnerability scanner 280, Admin module 285, a machine learning module 290, and a firewall 295. It is to be understood that FIG. 2 shows the majority of the modules, however, not all the modules and application software may be present in the interface system. For example, the interface system for residential use may have fewer modules and/or application software than an interface system for office/industry/commercial use. The interface system 100 can include a gateway 245, wherein the functioning of the gateway in a router is known to a skilled person. The disclosed interface system can include other functionality of a typical router such as packet forwarding, routing table, routing protocols, path determination, NAT, and like functionalities known to a skilled person for use in the router, and any such functionality is within the scope of the present invention.

The interface system 100 can include an integrated switch 250 that may allow connecting different devices in an internal network over a wired or wireless connection. The switch 250 can include functionalities, such as mac tables, switching, and like. The interface system 100 can also include access point 255, such as an integrated wireless controller and access point. The firewall 295 of the disclosed interface system can include advanced functionalities including VPN, packet filtering, proxy firewall, web filtering, NAT firewall, stateful multilayer inspection firewall, Malware, and virus filtering, monitor network traffic, security rules, encrypted traffic inspection, IPS/IDS, traffic shaping, logging, sandboxing, and like firewall technologies known to a skilled person and any such firewall technology is within the scope of the present invention.

The disclosed interface system can also include network access controller 270 that can monitor the different components and enforce security policies. The network access controller can receive data from different components of the interface system. The network access controller can provide for authentication of the connected devices. The network access controller 270 can create network incidence and appropriate response to the incidents. The network access controller 270 can be autonomous in handling security situations such as an ongoing attack or a security breach. The network access controller 270 can also include IP access control that includes features, such as physical access control, access badges, audit, access levels, and so on. The network access controller can request data from different components of the interface system shown in FIG. 2. The network access controller can calculate an average security score for any network traffic, device, or user, as shown in FIG. 5. The network access controller can increase or decrease the security score based on new data or existing data, as shown in FIG. 5. The network access controller can manage different modules based on implemented policies. The network access controller can receive input from the admin module 285 and can also display logs, details of threats, autonomous decisions, and approvals, and like through the admin module 285.

The vulnerability scanner 280 can provide for scanning the connected devices to determine any vulnerability. The vulnerability scanner 280 can give a score to each connected device based on the vulnerability, such as the lower the score value of the device on a predetermined scale, more the vulnerable can be the device. For example, a workstation running Windows 7 can be given a low score than the system running the latest and more secure operating system Windows 10. Similarly, smartphones can have different levels of securities including hardware level and software level. Moreover, the operating system of the smartphones may no longer be supported and thus not being updated with security patches. The vulnerability scanner 280 based on such and many other factors can score the devices connected to the network. Moreover, the vulnerability scanner 280 can also provide for periodic scanning of the devices for any malware. The score of the device can have several implications, such as access rights, level of monitoring, security zones, and like.

The vulnerability scanner 280, through the network access controller or the admin module 285, can send notifications about updating the software including operating systems. The vulnerability scanner 280 can also help to enforce the password policies, wherein the vulnerability scanner 280 can keep a check of passwords strength, exploited or leaked passwords, and can also monitor confidential information such as leaked credit card information. For example, the leaked passwords and credit card details can be monitored on the dark web.

SIEM tools, also known as security information and event management tools are a collection of software applications that can provide a range of security monitoring and logging functionality. The SIEM tools can provide for logging, store the data from connected devices for analysis, threat or alert detection, trends discovery, and like.

The disclosed system can also include a machine learning module 290 that can be pre-trained to handle various security situations for autonomous handling the network threats and security breaches. The machine learning module 290 can learn over time based on decisions taken by administrators and implemented policies. This can ensure that any network attack can be stopped in near real-time without human intervention and before causing any real damage. Humans generally take time to make decisions that can delay the appropriate action against an ongoing threat. For example, the machine learning module upon receiving information that certain keys are leaked or can be leaked due to a detected vulnerability can immediately change the keys and inform the administrators with the updated keys.

The admin module 285 can provide an interface for the administrators to interact with the disclosed interface system 100. The admin module 285 can implement decisions taken autonomously or based on instructions from the administration. The administrators can view the details of threats, logs, and autonomous decisions taken by the administrator. The admin module 285 can also request approvals from the administrators for different tasks and policy implementations. The admin module 285 can send notifications through SMS, email, and like messaging services to the users, administrators, and concerned persons. The admin module can utilize Push notifications such as Apple™ Push Notification Service (APNs), Google™ Cloud Messaging (GCM), Short Message Service (SMS), Amazon Simple Notification Service (Amazon SNS), and other proprietary protocols. Notifications or messages can include various types of data, audio, or text alerts. Notifications or messages can be sent via SMS, text, mobile push, HTTPS, pull channel, push channel, synchronous communication channel, a network socket, and email. The intrusion detection module 260 and the intrusion prevention module 265 can be used to detect and prevent any network intrusion.

FIG. 2 also discloses the interface system 100 including a camera 298. One or more cameras can detect the presence or absence of persons in an enclosed space in which the devices are present. The cameras can also detect any new person or unauthorized person in the enclosed space. The camera can also detect any unusual behaviors by the persons in monitored enclosed space. The network access controller 270 can be operably coupled to the camera. It is understood that more than one camera can be provided. Additionally, the camera can only provide information about the presence or absence of persons, rather than the images or video of the persons, for security and privacy reasons. In the case of an unknown person in the enclosed space, the camera can capture a photograph of the person and save the same for records and reporting. FIG. 2 also shows a robot as a part of the disclosed interface system 100. Robot 299 can provide for surveillance wherein the robot can manually move to different locations in the premises and can capture activities as photographs or video in real-time.

Figure 3:
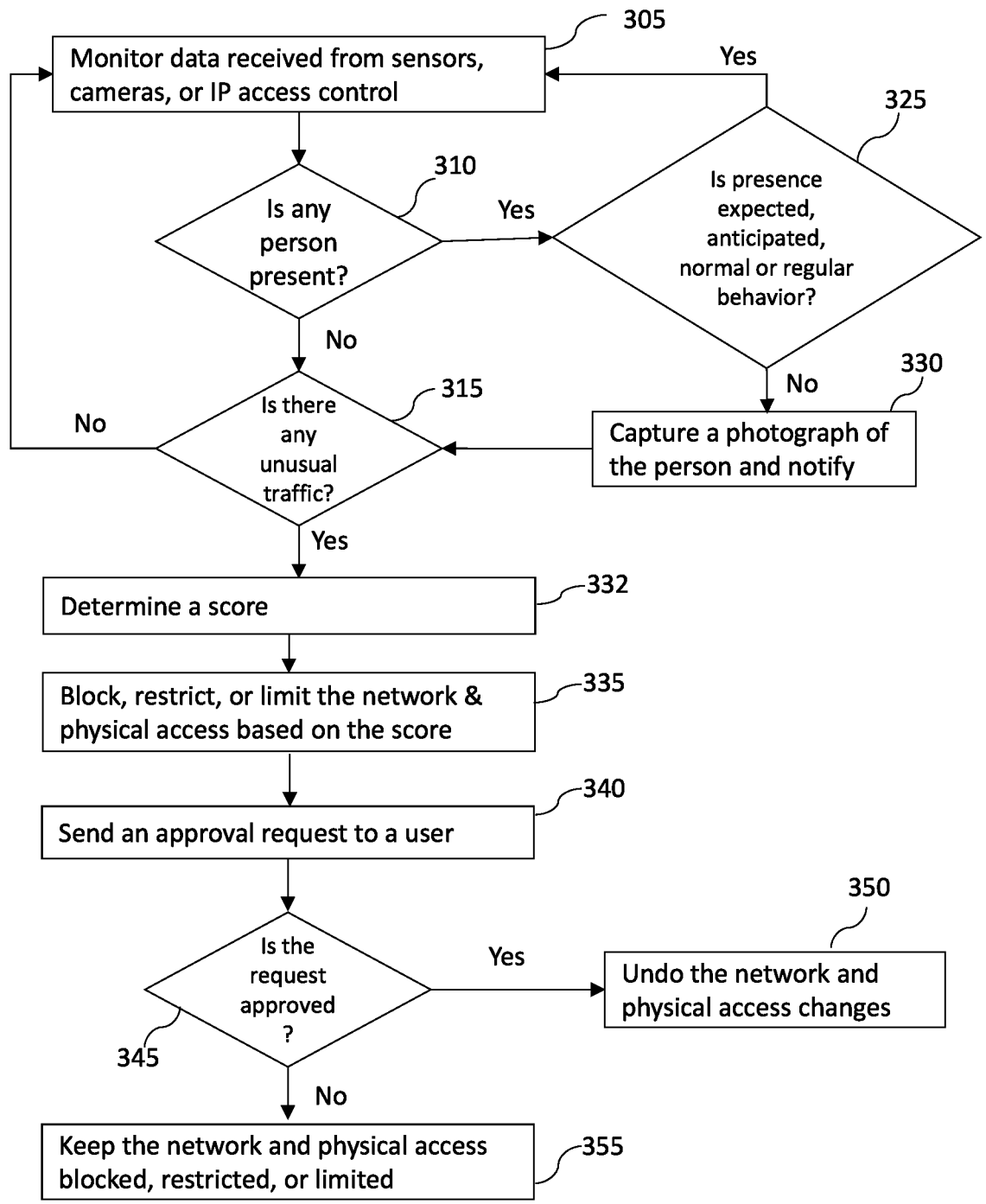
FIG. 3 is a flow chart showing an exemplary embodiment of the monitoring by the camera, according to the present invention.

Referring to FIG. 3 which is a flow chart showing an exemplary embodiment of the disclosed interface system 100. The disclosed interface system through one or more sensors, cameras or IP access control systems can monitor an enclosed space, at step 305. The enclosed space can be office premises, residential homes, and like buildings. Data received from sensors, cameras, and IP access control systems can be monitored at step 305. The network access controller can receive a signal from one or more cameras, sensors, or IP access control indicating the presence or absence of persons on the premises. The network access controller can check at step 310 if any person is present on the premises. If the presence of a person can be detected at step 310, the network access controller can check at step 325 if the person can be recognized or the presence of the person is expected or anticipated, and the behavior of the person is normal or regular. For example, the person can be an unauthorized person or a new person not known to the interface system. The network access controller can also notify a concerned person or user with relevant information received from one or more sensors, cameras or IP access control systems and may also raise any alarm on detecting the unrecognized person accessing the system resources or upon detecting any unusual activity in accessing the system resources, at step 330. If no new person can be recognized, the network access controller can continue monitoring the premises.

In case no person is present at step 310 or any unrecognized person can be detected at step 325, the network access controller can determine if any device has unusual network traffic or activity, a step 315. The unusual traffic can be failed login attempts, download of privileged information, transferring the files to an external hard disk, and activity to harm the network devices or steal information. If no such unusual traffic can be detected, the network access controller can continue monitoring the premises. In case, unusual traffic can be detected at step 315, a score based on the unusual traffic can be determined, at step 332. If the score is above the predetermined threshold, the network access controller can block, restrict, or limit the network and physical access for the system, at step 335. Additionally, the disclosed network access controller can lock the system or cancel the file transfer or can take any appropriate step as defined by the policies. After blocking, restricting, or limiting the network and physical access, the network access controller can send an approval request to a user for allowing the activity, at step 340. The user can be the authorized user of the device or an administrator. If the user approves the request at step 345, the network access controller can undo the network and physical access changes, at step 350. Otherwise, if the request is not approved at step 345, the network access controller can keep the network and physical access blocked, restricted, or limited at step 355. The administrators can then take appropriate action, for example, reporting the trespass and theft to the local authorities.

Figure 4:
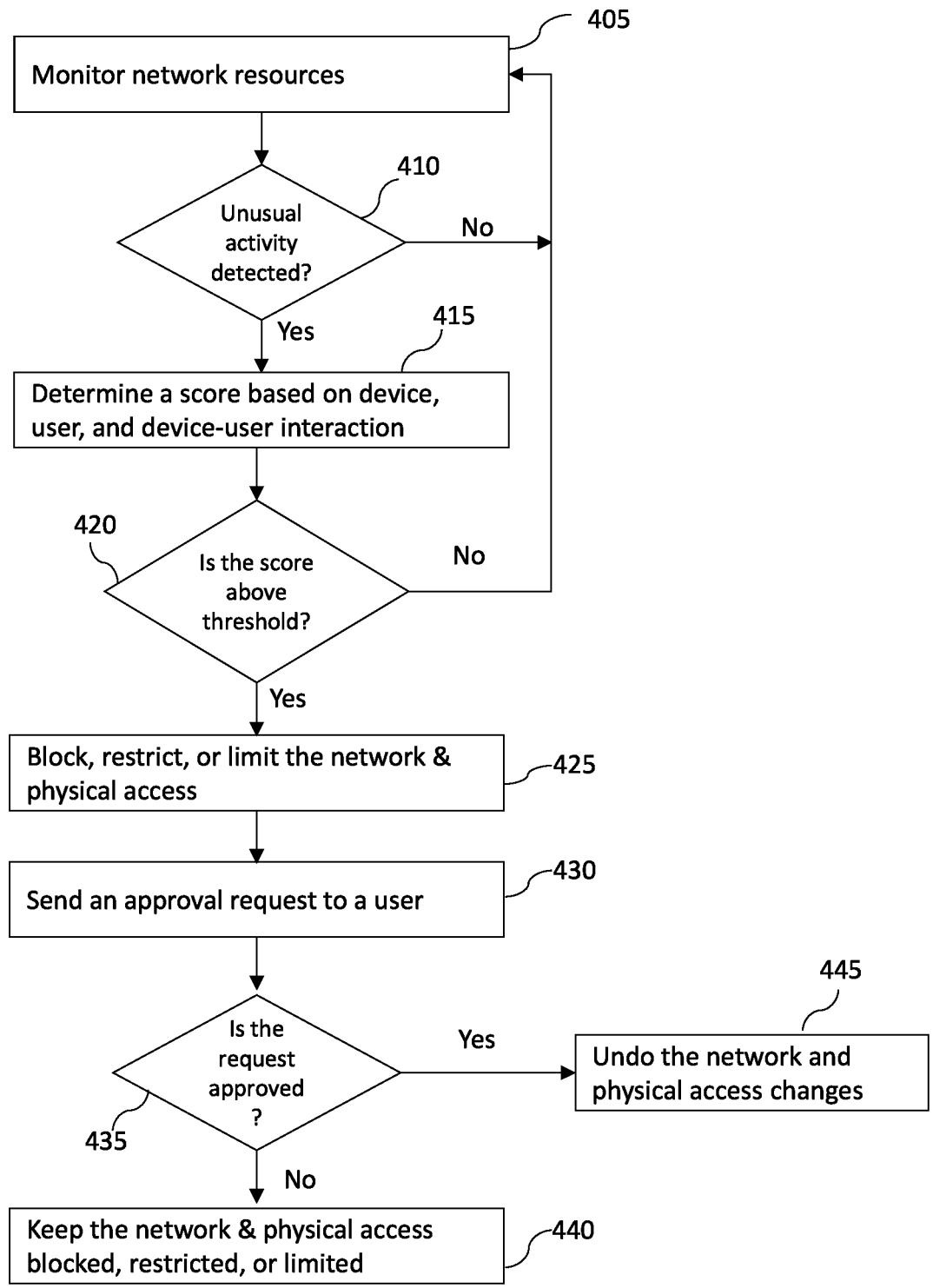
FIG. 4 is a flow chart showing an exemplary embodiment of disclosed interface system, according to an exemplary embodiment of the present invention.

Referring to FIG. 4, the network access controller can monitor the network resources including the devices on the network and databases, at step 405. The network access controller can check for any unusual activity at step 410. If no unusual activity can be detected at step 410, the network access controller can continue monitoring the network resources. In case, unusual activity can be detected at step 410, the network access controller can determine a score based on the device, the user, and device user interaction, at step 415. For example, the user uploading a large number of files can be considered an unusual activity and the score of the unusual activity can be determined based on the score of the device and the score of the user. The device can be scored by the vulnerability scanner. The user of the device can be scored based on whether the user is authorized to access the device, the duration for which the user has access, and different parameters can be considered to score the user. The user device interaction can also be scored, such as whether the user is continuously interacting with the device or is away, whether the user is getting errors or failed attempts and like factors can be considered. In the next step, the determined score can be compared to a predefined threshold, at step 420. The value of threshold can be proportional to the security level, hardened the security, lesser will be the threshold value, and more will be the prompts and manual intervention. If the calculated score at step 415 is below the threshold value at step 420, the network access controller can continue monitoring the network resources. However, if the calculated score is above the threshold value at step 420, the network access controller can block, restrict, or limit the network and physical access for the device, at step 425. Additionally, the network access controller can lock the device, or cancel any operation or process, or can take any appropriate step as defined by the policies. After blocking, restricting, or limiting the network and physical access, the network access controller can send an approval request to a user for allowing the activity, at step 430. The user can be the authorized user of the device or an administrator. If the user approves the request at step 435, the network access controller can undo the network and physical access changes, at step 445. Otherwise, if the request is not approved at step 435, the network access controller can keep the network and physical access blocked, restricted, or limited, at step 440.

In one exemplary embodiment, the disclosed interface system can determine that a device is under a DHCP attack and an STP attack is ongoing. The security score can be raised of the device being attacked, the network access controller can autonomously block the source of the attack or network access of the device through the admin module. Furthermore, the administrators through the admin module can review the details of the attack and the autonomous decision taken by the system and act accordingly.

In one exemplary embodiment, a user uploading a large number of files to a database through the internet. The interface system can determine a security score for the activity and if the security score is above the threshold value, the interface system can stop the uploading traffic of the user. The interface system can send a notification to the administrator. The administrator can respond back that the upload can be allowed, and the user was uploading pictures to a cloud application as a backup process. The interface system can learn that this kind of traffic to a particular application by a particular user is valid for future security score calculations.

In one exemplary embodiment, the interface system can run a vulnerability scan on the connected devices. So, the interface system can know the weaknesses, infections, capabilities, and risks of the connected devices. The interface system can know potential threats and associated risks of threats and attacks. When the interface system sees that someone internally or externally trying to exploit these vulnerabilities, and the risk to the connected device is much greater, the interface system can block the network access based on the new security score and let the administrator review it. In this way, the interface system can mitigate the security risk to the network and connected devices.

In one exemplary embodiment, the interface system can include a machine learning module to continuously improve itself by monitoring, identifying, learning, categorizing, assessing, detecting new threats and action taken to protect the network and connected devices. Whenever the cumulative scoring or security scoring is above the threshold, the action is taken by any or all the components of the interface system. The interface system gets more intelligent and smarter over time by learning from the attacks, feedbacks, actions, and can take more autonomous decisions and less human intervention. The interface system, using the scoring functionality, can prioritize the greater security risk as it gives a higher security score to critical security issues. Detailed reports can be generated for the administrators to suggest how to securely harden the security of the connected devices and restore things back to a normal state after the attack. The interface system can autonomously or advise taking steps to upgrade, patch, remove the vulnerability, remove malware, remove viruses, and remove applications from the connected devices.

The interface system can perform risk management based on all the information gathered. The interface system can be a goal or environment or organization or business or mission oriented. The interface system can be focused on goal or environment or organization or business or mission requirements and resources. Security scores can also focus more on these orientations and requirements. For example, the interface system can be told that it is implemented in a bank so that it can focus on financial activities and security scores are calculated based on the specific orientation, requirement, and resources. Further actions, feedback, and further investigation, actions, improvement are done based on the specific orientation, requirement, and resources. Basically, the interface system can determine the most important organization or business unique needs according to the setup or implementation and perform the Security accordingly.

The interface system can be set to meet legal requirements, regulatory requirements, guidelines, practices, and security standards. For example, the interface system can save the attack information so that it can be presented in a court of law. For example, the interface system can save data for a year to meet the regulatory requirements. Administrators can manage the interface system by first authenticating locally or using Radius, TACACS+, One-time passwords, smart cards, two-factor authentications, etc.

The interface system can analyze intelligently the complete network to knows which connected device is performing reconnaissance attacks such as packet sniffers, port scans, ping sweeps, internet information queries, etc. The interface system knows which connected device is performing access attacks such as password attacks, trust exploitation, port redirection, Man in the middle attack, buffer flow, etc. When the interface system sees that the security score is above the threshold, the interface system can take actions such as stopping Internet Control Message Protocol (ICMP) traffic, blocking network and physical access of the computer, etc.

The interface system can know if a bad user is jumping from one connected device to another, or moving wired to wireless connection, moving from one floor to another, etc. The interface system can monitor and take proper security actions if the security score crosses the threshold for that user. This is the beauty of the interface system as it has a complete posture and it can track any user, connected device, network traffic, and take proper action. The interface system can increase security score if it detects a physical intruder based on data received from the Camera, IP access control, and sensors. The interface system can act by locking the critical rooms such as the Server room, electric control room, etc.

The interface system can stop DOS and DDOS attacks done internally or externally. The interface system will preempt it as it has a complete security posture and it will stop the DOS and DDOS attacks on a fly. The interface system will inform the administrators via secure communication and do more investigation based on the feedback from the administrator. The interface system can take more actions if needed.

With the interface system, users will be able to know if a Trojan horse or rootkit is on their machine. For example, a user has downloaded a game on his computer but behind the scenes, the game is trying the gather information about other connected devices and sending that information to someone on the internet. The interface system can track this on the fly and stop these actions and notify the administrator about it. Based on the feedback from the administrator, the interface system can perform more investigation and take appropriate actions. The interface system can provide a detailed report to the administrator indicating that there is a Trojan Horse or a rootkit on a computer.

The interface system can stop worms as the worms propagate through a computer network without user intervention and once it gets into one system, the worm will try to identify other systems which it can exploit. The interface system can stop spoofing attacks.

The interface system can encrypt all the saved data and only authorized administrators can access the saved data. The interface system can hear from different components, such as from a gateway that a computer is performing reconnaissance and gathering information, from a scanner that a laptop is showing critical vulnerabilities, from the firewall that the computer is trying to gain access to a laptop using wrong user credentials.

In one exemplary embodiment, the interface system can receive information that a computer B is sending a lot of ICMP traffic and TCP Syn packets. The firewall tells the interface system that computer B is talking to a bad IP address on the internet. Based on all these activities, the interface system can calculate the security score and if it is above the threshold, the interface system can cause the switch and the access point to block computer B on the network. The interface system will notify Admin and get feedback. On feedback, the interface system can perform more investigations and take appropriate actions if needed.

The interface system can know if there are internal and external Gratuitous ARP requests, or multiple SSH requests, or multiple login failures. The interface system can perform more investigations and keep a track of it. The interface system can take proper actions if the security score is above the threshold.

The interface system can monitor the memory and CPU utilization of all its components. For example, on a switch, an attacker can cause a Spanning tree loop, broadcast storm, CAM overflow attack, Man in the middle attack using gratuitous ARP requests, and so on. The interface system can take proper actions at Layer 2 to counter these attacks. The interface system can increase port security and wireless security. The interface system can increase restrictive changes from where the attack is happening. The interface system can implement Spanning Tree security, storm control, and create restrictive VLANs. Furthermore, on a Router, an attacker can attack a DHCP server. The interface system can implement DHCP snooping, DHCP rate limiting on a fly. The interface system can let the admin know about it and get an admin response before taking more actions across all the components.

Even connected devices can send information or data to the interface system. For example, connected devices have HIPS installed which can send all the data to the interface system.

In one exemplary embodiment, multiple interface systems can be centrally controlled. For example, a single interface system can be provided for each site, such as multiple offices, data centers, residential, and like facilities can have multiple interface systems and all such interface systems can be connected to a master interface system that provides the interface systems to securely communicate. In one case at different sites or locations can connect with each other via multipoint MPLS network, ISP-provided direct Layer 2 connections, ISP-provided direct Layer 3 connections, L2TP (Layer 2 Tunneling Protocol) tunnels, IPSec (IP Security) tunnels, PPTP (Point-to-Point Tunneling Protocol), GRE (Generic Routing Encapsulation), Site to Site VPN, Cloud VPN Gateway, DMVPN, Full Mesh VPN solutions, Layer 2 VPNs, Layer 3 VPNs, SD-WAN, Azure Virtual WAN and like technologies known to a skilled person for securely connecting two devices in a network, and such network technology is within the scope of the present invention for connecting two or more interface system with each other or to a master interface system.

In one exemplary embodiment, the notifications or Alerts can be sent to the administrators by the admin module with a brief explanation of the App, and three feedback options can be given to the administrators regarding the Network Traffic, device actions or behavior, or User actions or behavior, etc. First, yes, Admin is totally aware of it, it is expected and it is totally normal. Second, no, Admin is not aware of it at all, it is not expected, and it is suspicious to Admin as well. Third, Not Sure, Admin is not aware of it, but it can be normal. It can be either way. In case, the feedback is yes, the interface system can learn and store that it is normal for the future, decrease the security score for it, and roll back any changes already taken. A detailed report is sent to the Admin via the App.

In case, the Feedback is No, the interface system can learn and store that it is not normal for the future; increase the Security Score for it; based on confirmation that it is not normal, more Analysis or investigation will be done on Old data (alerts, notifications, logs, incidents, errors, etc.) received from all the components (e.g. Routers, Firewalls, Switches, Wireless Controllers, Access Points, NACs, Scanners, SIEMs, Cameras, and sensors) of CISGW, and based on confirmation that it is not normal, more analysis or investigation will be done on current or Live data (alerts, notifications, logs, incidents, errors, etc.) received from all the components (e.g. Routers, Firewalls, Switches, Wireless Controllers, Access Points, NACs, Scanners, SIEMs, Cameras, and sensors) of CISGW, and based on confirmation that it is not normal, more Analysis or investigation can be done by requesting more or specific information from the components (e.g. gateway, Firewalls, Switches, Wireless Controllers, Access Points, NACs, Scanners, SIEMs, Cameras, and sensors) of interface system, behavioral analysis, profiling network traffic, device, or user; and data correlation; artificial intelligence, machine learning, past feedbacks from the Admins from an App. The action taken by the interface system can depend upon the issue, for example, if the security issue is related to the Router or Layer 3, action, tuning, and changes can be done at the Router or Layer 3; if the security issue is related to the Switch or Layer 2, the action, tuning, or changes can be done at the Switch or Layer 2; if the security issue is related to the Firewall or Layer 4-7, the action, tuning, changes can be done at the Firewall or Layer 4-7; if the security issue is related to the Wireless, the action, tuning, or changes can be done at the Access Point or Wireless LAN Controller; if the security issue is related to multiple layers. The action, tuning, or changes can be done across all the network devices.

In case of the Feedback is Not Sure, the interface system can keep the changes and a detailed report can be sent by the admin module. Later, the administrator can review the three Feedback options based on detailed description, experience, issues, or just change of mind. Administrators can deselect previous options and can select any other options.

Figure 6:
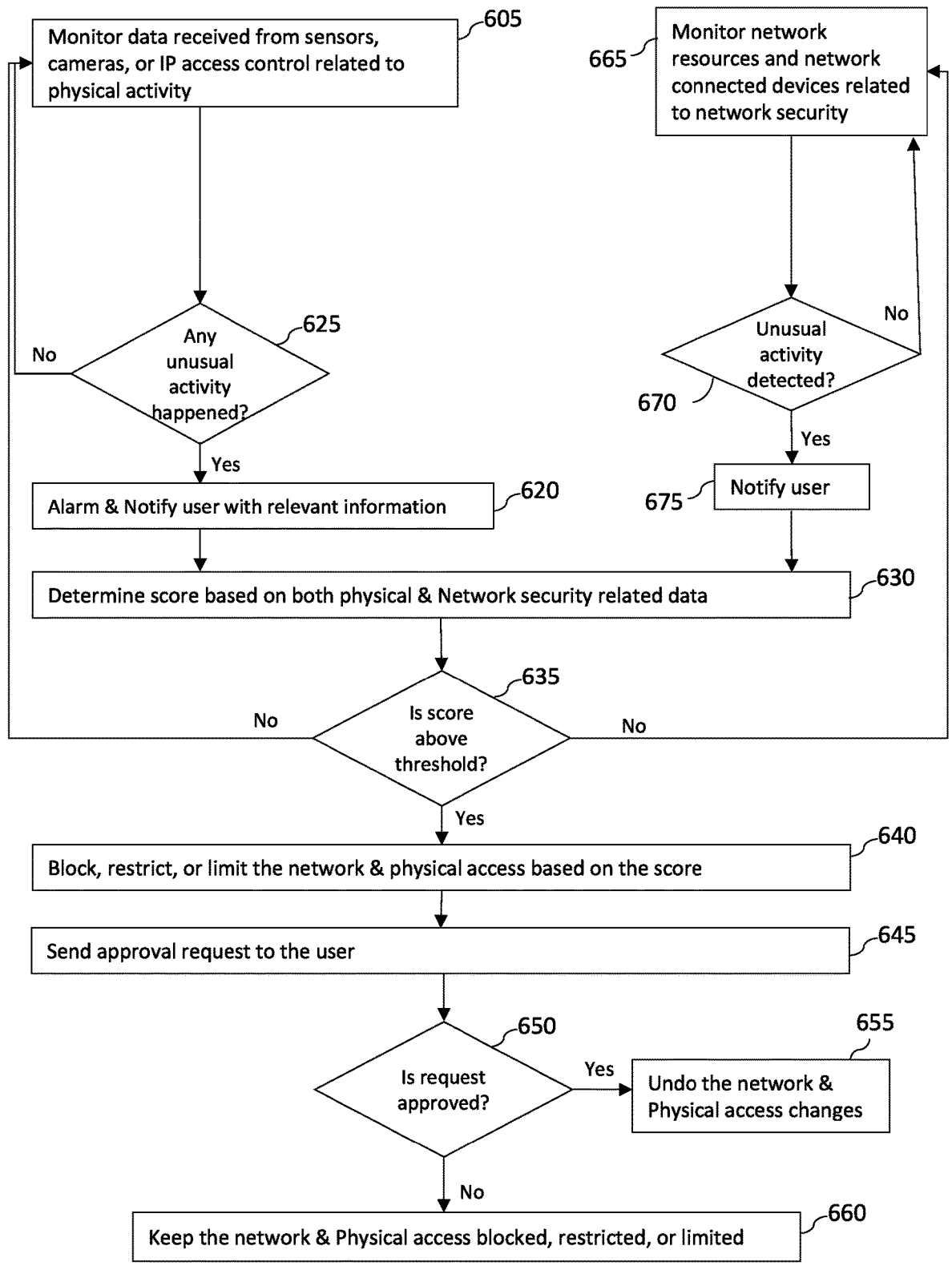
FIG. 6 is a flow chart showing an exemplary embodiment of the disclosed interface system, according to the present invention.

Referring to FIG. 6 which shows an exemplary embodiment of the interface system and method for providing security to devices on a network. The disclosed system can monitor data received from sensors, cameras, or IP access control related to physical activity, at step 605. The sensors can be temperature, humidity (hygrometer), dew point (thermometer), door or windows open-closed, motion, occupancy, current meters, light intensity, light barriers, light brightness, thermocouple, voltage detection, accelerometer, vibration meter, water detection, pulse counters, pressure meter, button press, gas detection, resistance detection, ultrasonic ranging, air quality, air velocity, fine dust heat image, air pressure, food thermometer, distance, vehicle detection, soil moisture, smoke, carbon monoxide and like sensor known to be used to buildings for detecting environmental variables. The IP access control can be for regulating physical access to a location and can be a security system based alphanumeric password, fingerprint or biometric pattern identification system, badge enrollment, card enrollment, tag enrollment, access key enrollment, door locks, readers, and like systems known to a skilled person for securing access to a space. The disclosed system can check for any unusual activity, at step 625. The unusual activity can be fire, smoke, gas, high temperature, water leakage detection, unusual activity of the network device, and like. If no unusual activity can be detected at step 625, the system can continue monitoring at step 605. However, if the unusual activity can be detected at step 625, the disclosed system can raise the alarm and notify the concerned user with relevant information related to the happening of the unusual activity, at step 620. The disclosed system upon detecting the unusual activity can also determine a score based on both, at step 630. The score can be checked at step 635 and if the score is less than the predetermined threshold, the disclosed system can continue monitoring at step 605. However, if the score is above the predetermined threshold at step 635, the disclosed system can block, restrict, or limit the network & physical access based on the score, at step 640. Once, the network & physical access is blocked, restricted, or limited at step 640, the disclosed system can send an approval request to the user, at step 645. The approval request can be checked at step 650 and if the approval request can be approved then the system can undo the network and physical access changes at step 655, else if the approval request cannot be approved at step 650, the disclosed system can keep the network and physical access blocked, restricted, or limited, at step 660.

The disclosed system can also monitor network resources and network connected devices related to network security, at step 665. If any unusual activity related to the network could be detected at step 670, the disclosed system can notify the user about the unusual activity at step 675. Steps from 630 to 660 as described above can be performed to permit or block the network and physical access.

Against referring to FIG. 6, the disclosed system can detect unusual physical activity at step 625 from the physical security related data obtained from the sensors, cameras, or IP access control notice. For example, persons in a predefined space can be identified by the camera or sensors, and upon founding a person, the presence of whom in the predefined space is not normal, the score can be increased based in the physical security related data. The person can be the one who is not authorized person to enter the predefined space or was at the predefined space outside the working hours, such as at the night. Depending on the predefined rules, the change in scope can be determined. The new score may or may not be above the threshold. The system can continue monitoring the person, and if the act of the person seems to be suspicious, for example, accessing a network device, the score can be further raised and the new score can be above the threshold and the step 640 can be executed by the disclosed system. However, if the person leaves the predefined space, the score can be further lowered down. Acts, such as tampering with the temperature or cause a fire or cause a water leakage which can cause harm to the databases or servers where sensitive data is saved can be giver higher score. Herein the system can limit the physical access by shutting down the databases or servers to reduce the harm. Rules can be defined based on the act, such as an act to harm the servers can initiate a server lock down and background files backup to a new location. It is understood that the disclosed system can be connected to door locks for locking and unlocking the door locks.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An interface system for securing devices on a network from physical threats, security breaches, intrusions, and network attacks, the interface system comprises a processor and a memory, the interface system configured to implement a method comprising the steps of:

receiving, from a plurality of sensors, a plurality of cameras, and an IP access control device, a physical security data for an enclosed premises;

determining, an unusual physical activity in the enclosed premises based on the physical security data;

receiving a network security data from a plurality of devices on one or more networks in the enclosed premises;

determining an unusual network activity based on the network security data;

upon determining the unusual physical activity and/or the unusual network activity, determining a first score based on the physical security data of a first predetermined duration and the network security data of a second predetermined duration using a set of predefined rules;

comparing the first score with a predetermined threshold value; and upon comparison, manipulating a network access of one or more devices of the plurality of devices, and/or manipulating a physical access of persons to the enclosed premises or units within the enclosed premises, upon manipulating the network access and/or the physical access, generating an approval request; and upon receiving an approval, undoing the network and physical access related changes.

2. The interface system according to claim 1, wherein the plurality of sensors comprises a motion sensor, an air quality sensor, a humidity sensor, a temperature sensor, a dew point sensor, a water detection sensor, a smoke/fire sensor, and a carbon monoxide/gas alarm.

3. The interface system according to claim 1, wherein the step of manipulating the network access comprises blocking, restricting, or limiting the network access of the one or more devices.

4. The interface system according to claim 1, wherein the step of manipulating the physical access comprises blocking, restricting, or limiting the physical access of the persons to the enclosed premises or the units within the enclosed premises.

5. The interface security system according to claim 4, wherein the step of blocking the physical access comprises locking a server room in the enclosed premises, wherein the method further comprises the step of:

upon locking the server room, triggering a security alarm.

6. The interface system according to claim 5, wherein the security alarm comprises an audio alarm and a flashing light alarm.

7. The interface system according to claim 1, wherein the step of manipulating the physical access comprises powering off a server, powering off an appliance, powering off a power line, shutting down a water source, and shutting down a gas source.

8. The interface system according to claim 1, wherein the interface system further configured to implement the steps of:

receiving a vulnerability score of the one or more devices from a vulnerability scanner also implemented within the interface system, wherein the first score is further based on the vulnerability score.

9. The interface system according to claim 8, wherein the vulnerability score is calculated by performing vulnerability scanning of the one or more devices.

10. The interface system according to claim 1, wherein the plurality of devices comprises an IoT device, a smart TV, and a computer.

11. The interface system according to claim 1, wherein the approval request is sent and received via an email, a text, or a voice message.

12. The interface system according to claim 11, wherein the approval request comprises a notification message, an incident report, and actions summary.

13. The interface system according to claim 1, wherein the physical security data comprises identifications of persons in the enclosed premises, tracking activities of the persons, and incidences of damages to the enclosed premises and the plurality of devices.

14. The interface security system according to claim 13, wherein the network security data and physical security data comprises logs, alerts, notifications, incidents, and errors generated by the plurality of devices.

15. The interface security system according to claim 14, wherein the unusual physical activity comprises a presence of an unauthorized person in the enclosed premises and a suspected behavior of the person to cause harm to a device of the plurality of devices or to the enclosed premises.

16. An interface system for securing devices on a network from physical threats, security breaches, intrusions, and network attacks, the interface system comprises a processor and a memory, the interface system configured to implement a method comprising the steps of:
receiving, from a plurality of sensors, a plurality of cameras, and an IP access control device, a physical security data for an enclosed premises;
determining, an unusual physical activity in the enclosed premises based on the physical security data;
receiving a network security data from a plurality of devices on one or more networks in the enclosed premises;
determining an unusual network activity based on the network security data;
upon determining the unusual physical activity and/or the unusual network activity, determining a first score based on the physical security data of a first predetermined duration and the network security data of a second predetermined duration using a set of predefined rules;
comparing the first score with a predetermined threshold value; and
upon comparison, manipulating a network access of one or more devices of the plurality of devices, and/or manipulating a physical access of persons to the enclosed premises or units within the enclosed premises,
wherein the first score is calculated using behavioral analysis, profiling user/device activity, artificial intelligence, machine learning and security analysis on the physical security data of the predetermined duration and on the network security data of the predetermined duration.

17. The interface system according to claim 16, wherein the first score is calculated using past approval requests and feedbacks from an administrator.

18. A method for securing devices on a network from physical threats, security breaches, intrusions, and network attacks, the method implemented within an interface system comprising a processor and a memory, the method comprising the steps of:
receiving, from a plurality of sensors, a plurality of cameras, and an IP access control device, a physical security data for an enclosed premises;
determining, an unusual physical activity in the enclosed premises based on the physical security data;
receiving a network security data from a plurality of devices on one or more networks in the enclosed premises;
determining an unusual network activity based on the network security data;
upon determining the unusual physical activity and/or the unusual network activity, determining a first score based on the unusual physical activity and/or the unusual network activity using a set of predefined rules;
comparing the first score with a predetermined threshold value;
upon comparison, manipulating a network access of one or more devices of the plurality of devices, and/or manipulating a physical access to the one or more devices, the enclosed premises or units within the enclosed premises;
upon manipulating the network access and/or the physical access, generating an approval request; and
upon receiving an approval, undoing the network and physical access related changes.

* * * * *